Dec. 13, 1949     M. E. BOBO ET AL     2,491,084

MATHEMATICAL EDUCATIONAL GAME

Filed June 2, 1947

INVENTORS:
WALDO S. MILLER
MILDRED E. BOBO
BY WHITEHEAD & VOGL
PER Earle Whitehead
ATTORNEYS Patented Dec. 13, 1949

2,491,084

UNITED STATES PATENT OFFICE 2,491,084

MATHEMATICAL EDUCATIONAL GAME

Mildred E. Bobo, Jefferson County, and Waldo S. Miller, Denver, Colo.

Application June 2, 1947, Serial No. 751,897

4 Claims. (Cl. 35—30)

This invention relates to educational devices with which mathematical games may be played primarily for educational purposes.

An object of the invention is to provide a base member having thereon the numerals constituting answers to various mathematical problems and a plurality of card-like members each bearing numerals constituting a problem, the answer to which appears on the base, there being several members bearing different combinations of numerals for each answer, the base having engaging means adjacent each answer and the members bearing the numerals constituting the problem answered thereby having means adapted to interengage said engaging means, the engaging means at each answer being different from all other engaging means whereby the members can be interengaged with the engaging means only adjacent the answer to the problem carried by the member.

A further object is to provide a mathematical education game whereby the member carrying the problem can be manually fitted to the base carrying the answer only adjacent to the answer to the problem and the answer then found on the base or the player knowing the answer to the problem on the member he is playing can visually locate the answer and then put said member into engagement with the base adjacent the proper answer, whereby the player who most readily knows the answers will most quickly get his members placed in proper position on the base.

With these and other objects in view, all of which shall more fully hereinafter appear, the invention comprises certain novel constructions, combinations and arrangements of parts as will now be described and then defined in the appended claims and as illustrated in the accompanying drawing in which Figure 1 is a plan of the base showing answers and engaging means.

Figure 1:
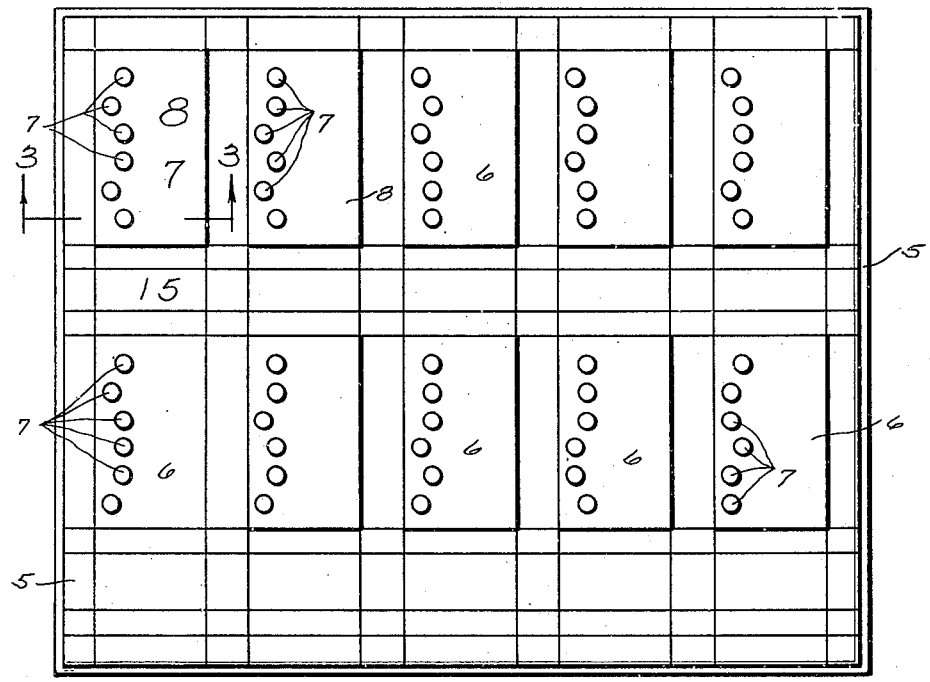

Various forms of engaging means on the base and interengaging means on the members may be provided but we prefer to use the means illustrated in the drawing and now described, and the description will be in terms of such means but we do not thereby exclude other forms of engaging and interengaging means.

Figure 2:
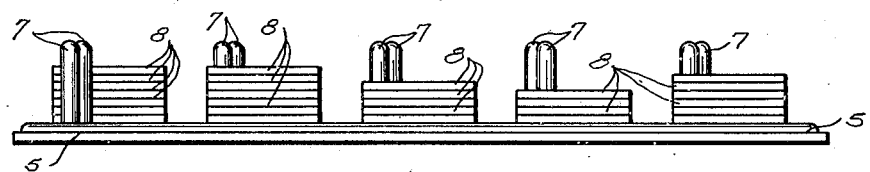
Figure 2 is a front or edge elevation of the base and engaging means and illustrating some of the members interengaged with the engaging means.
Figure 4:
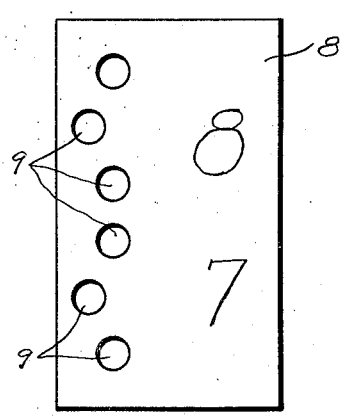
Figure 4 is a plan of a member adapted to interengage means adjacent the answer "15" on the base.
Figure 3:
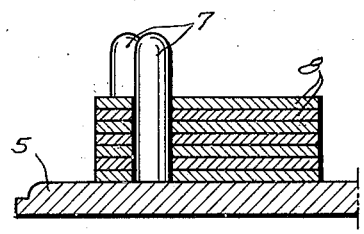
Figure 3 is a fragmentary section on line 3—3 of Fig. 1.

The base 5 preferably has its surface subdivided into a plurality of sections 6, as many sections being provided as the number of problems desired to be included in the game. Ten are here shown. At each section is a plurality of pins or pegs 7 set into the base in irregular order, the order of setting at each section being different from the order in all other sections. At the bottom of each section is an answer to the problem carried on each of the members which can be placed on that section, in manner later described, for example the answer "15" below the space at the upper left corner of the base. Members 8 of shape preferably corresponding to the shape of sections 6 and of any desired material and thickness, are provided with holes 9 arranged in order corresponding to pegs 7 at one of the sections and carrying numerals constituting the problem the answer to which appears at the bottom of that section at which the order of the pegs corresponds to the order of the holes on the member. Here the largest number of members placed on any section is illustrated as seven, at Fig. 3 and left at Fig. 2. The member illustrated at Fig. 4 is provided with holes arranged to correspond to the order of the pegs at the section above the answer "15" and the member carries the numerals 8 and 7 in vertical arrangement giving the problem of 7 added to 8 and when the said member is interengaged with the pegs at the section indicated, the answer to the problem appears at the bottom as "15."

A game of addition is above described, it being understood that in the addition game each member carries numerals, arranged for addition, which, when added together, will give the total which appears below that section at which the order of pegs corresponds to the order of the holes in the member.

For playing the game of subtraction two numerals are arranged on the member for subtraction and the quotient appears at the bottom of that section at which the order of the pegs corresponds to the order of the holes in the member. The answers at the bottoms of the sections may, if desired, be erasably written or imprinted so that answers for addition or subtraction, multiplication or any other problems, adapted to such a game, may be written in thus making a single base adaptable for various games.

There are obviously various ways of playing these games, one of which will be described for illustration. Suppose two players, each having a base and a complete set of addition members. At a given signal each player begins to place his members at the sections below which is the answer to the problem carried by the member he is playing. The player first placing all of his members wins the game. The player who can mentally get the answers to the problems on his members can place the members more rapidly than the player who has to manipulate the members manually in an effort to find the peg arrangement corresponding to the arrangement of hole in the member he is playing. Between the one who can get all the answers mentally at once and he who must manipulate each member in effort to find the required peg arrangement, there will be many variations in the ability of the players. He who must play by finding the required peg arrangement for each member will learn the answer to each problem by seeing it below the member when he has positioned it on the section at which he finds the required peg arrangement.

While we have illustrated and described various details of construction, many alternative and equivalent structures will occur to those skilled in the art and which are within the scope and spirit of our invention and the foregoing specification and the appended claims, and we are not to be restricted in our protection to the details here illustrated and described.

We claim:

1. A game device comprising in combination a plurality of card-like members, a base member adapted to accommodate a plurality of stacks of said members at predetermined positions on the base, characters on each member constituting a problem, answers to problems at points on the base adjacent the predetermined positions of the stacks and interengaging means on the base and members, said means being so arranged that only those members carrying problems whose answer is the same can be interengaged with the means adjacent such answer on the base.

2. In a game device as defined in claim 1, the interengaging means comprising a plurality of pegs carried by the base adjacent each answer and orifices in those members carrying a problem appropriate to such answer arranged in correspondence with said pegs whereby a plurality of members carrying a problem having a certain answer carried on the base can be stacked on the base adjacent said answer with their orifices interengaging the pegs adjacent said answer.

3. In a game device as defined in claim 2, the arrangement of said pegs being different at each answer from the arrangement at all other answers and the orifices in the members being correspondingly arranged.

4. A game device comprising a base whose surface has a plurality of sections provided thereon, a plurality of pegs upstanding from said base in each of said sections, an answer to a problem carried on the base adjacent each section, a plurality of orificed card-like members arranged in sets, the members of each set carrying characters presenting a problem, the answer to which appears on the base at one section, the pegs in each section being arranged differently from the pegs in each other section and the orifices in the members of each set being arranged to co-mate with the pegs in the section adjacent to which appears the answer to the problems carried by said set of members.

MILDRED E. BOBO.
WALDO S. MILLER.

REFERENCES CITED

The following references are of record in the file of this patent:

UNITED STATES PATENTS

| Number | Name | Date |
| --- | --- | --- |
| 569,846 | Thompson | Oct. 20, 1896 |
| 1,396,379 | Moore | Nov. 8, 1921 |
| 1,539,909 | Paris | June 2, 1925 |
| 2,415,342 | Donner | Feb. 4, 1947 |